United States Patent [19]

Izumi et al.

[11] Patent Number: 4,633,319

[45] Date of Patent: Dec. 30, 1986

[54] METHOD AND APPARATUS FOR DETECTING FOCUSING IN AN IMAGE PICKUP DEVICE

[75] Inventors: Akio Izumi; Hideyuki Tanaka, both of Yokosuka, Japan

[73] Assignee: Fuji Electric Co., Ltd., Japan

[21] Appl. No.: 757,133

[22] Filed: Jul. 19, 1985

[30] Foreign Application Priority Data

Aug. 8, 1984 [JP] Japan .................... 59-166071

[51] Int. Cl.⁴ .......................................... H04N 5/232
[52] U.S. Cl. .................................... 358/227; 354/402; 354/409
[58] Field of Search ................ 358/227, 209; 354/400, 354/402, 406, 409; 352/140

[56] References Cited

U.S. PATENT DOCUMENTS

| | | | |
|---|---|---|---|
| 4,301,478 | 11/1981 | Sakane et al. ................... | 358/227 |
| 4,333,716 | 6/1982 | Sakane et al. ................... | 354/406 |
| 4,470,676 | 9/1984 | Kinoshita et al. ................ | 354/406 |

FOREIGN PATENT DOCUMENTS 55-137784 10/1980 Japan .

*Primary Examiner*—Russell E. Adams
*Attorney, Agent, or Firm*—Brumbaugh, Graves, Donohue & Raymond

[57] ABSTRACT

Apparatus for adjusting the focus of an optical system comprising an image pickup device providing an image detection plane where the image of an object is focused via the optical system to be adjusted and a circuit for processing the analog video signal provided by the pickup device to control the focus. The circuit comprises a means for forming a time and level shifted version for comparison with the unshifted analog video signal and means for shifting the focus to minimize the length of time during which this comparison exceeds a prescribed threshold level.

9 Claims, 22 Drawing Figures

METHOD AND APPARATUS FOR DETECTING FOCUSING IN AN IMAGE PICKUP DEVICE

TECHNICAL FIELD OF THE INVENTION

The present invention relates to apparatus for detecting the focused state of an adjustable optical system on the basis of an analog video signal representing an image of an object to be picked-up focused on an image detection plane of an image pickup device through the adjustable optical system, and to a method using such apparatus.

As such an image pickup device, there have been used a video camera and a device which utilizes a variety of image sensors constituted by a group of photosensors arranged linearly or two-dimensionally. Such an image pickup device is employed for the purpose not only of photographing a picture or an image, but also performing measurement, such as remote control measurement of a size of an object by utilizing the image of the object. In either event, frequently it is a key point in use to put an optical system in its focused state. The present invention particularly relates to detection of the focused state in an image pickup device, which is suitable for the purpose of performing the latter measurement.

BACKGROUND OF THE INVENTION

As described above, it is often important that an optical system using an image pickup device be focused for optimum use of the image pickup device. When the image pickup device is used in performing remote control measurement or in performing pattern recognition, measured values or results of judgment are directly affected by whether the optical system is in its focused state or not, and therefore it is important to have the optical system in its focused state accurately prior to use. In the case of a camera, an object to be picked-up may be viewed through a finder and focused by the visual sense of a person. However, the visual sense is not desirable because there may be an individual difference in judgment as to whether the object to be picked-up is focused or not. There has been proposed a method of adjusting an optical system so as to agree with a numerical value of the distance measured by using a range finder. However, there is a possibility that the optical system gets out of order as the time elapses and therefore it is still necessary to ascertain directly whether the focused state has been obtained or not. In the case of measurement, or the like, a video signal obtained from an image pickup device is processed or utilized in any case and it is therefore most desirable in the measurement to judge whether the focused state has been obtained or not on the basis of the video signal.

In judging a focused state on the basis of a video signal, one can expect that the focused state has been obtained when the video signal shows the steepest leading or trailing edge in a portion where there is a difference in hue or in distribution between a bright and a dark portion in an object to be picked-up by utilizing the fact that the image becomes unclear when the focus is shifted. Similarly there may be utilized a difference in brightness and/or hue between the object to be picked-up and the background. It is possible to inspect waveforms showing the leading and trailing edges of a video signal by using a synchroscope or the like and it is also possible to perform focus adjustment while inspecting the waveforms obtained with such a measuring instrument. However, a relatively expensive measuring instrument and technical skill for using such an instrument are required and the inspection of the waveform itself depends on a visual sense of a person so that it is impossible to avoid an individual difference to a certain extent.

Accordingly, attempts have been made to do the focusing electrically, eliminating subjective judgments. However, it has been characteristic of prior art techniques of this kind that they have tended to be sensitive to the illumination level of the object and have tended to depend heavily on threshold settings determined by the expected levels of illumination of the background and object.

An object of the present invention is therefore to overcome such difficulties in the prior art and to obtain a novel method for detecting focusing which is little affected by variations in intensity of illumination received by an object to be picked-up and which employs equipment which is relatively simple.

A secondary object of the invention is to obtain a novel method for detecting focusing in which detection of focusing can be performed accurately even in the case where contrast in quantity between the light from an object and the light from a background and/or a difference in brightness and/or hue in the object are small.

A related object is apparatus for performing this novel method.

SUMMARY OF THE INVENTION

The above objects can be attained, according to the present invention, by an apparatus which includes means for time-shifting an analog video signal by a predetermined time without changing its shape and a level, means for shifting an average level of the analog video signal by a predetermined value; means for generating a first and a second comparison signal different from each other on the basis of the shifting of the analog video signal; means for comparing the first and second comparison signals; means for detecting the length of time during which an instantaneous value of one of the comparison signals exceeds an instantaneous value of the other comparison signal; and determining that point at which the optical system is adjusted to make the length time a minimum for use as the focal point.

It can be appreciated that such an arrangement avoids critical threshold settings that depend on the illumination levels and so it becomes unnecessary to adjust the level of threshold in accordance with variations in intensity of illumination received by the object to be picked-up, and the circuit arrangement is essentially simplified. In the present invention, the time shift circuit and the level shift circuit employed can be preset independently of external variable factors because the waveform of the video signal can be shifted by a predetermined time independently of the intensity of illumination in the former circuit and the latter circuit may be only a bias circuit since in the latter circuit the average level of the video signal is merely shifted by a predetermined level.

BRIEF DESCRIPTION OF THE DRAWING

FIG. 4 illustrates an alternate arrangement for illuminating an object in accordance with the invention.

DETAILED DESCRIPTION OF THE INVENTION

Figure 1:
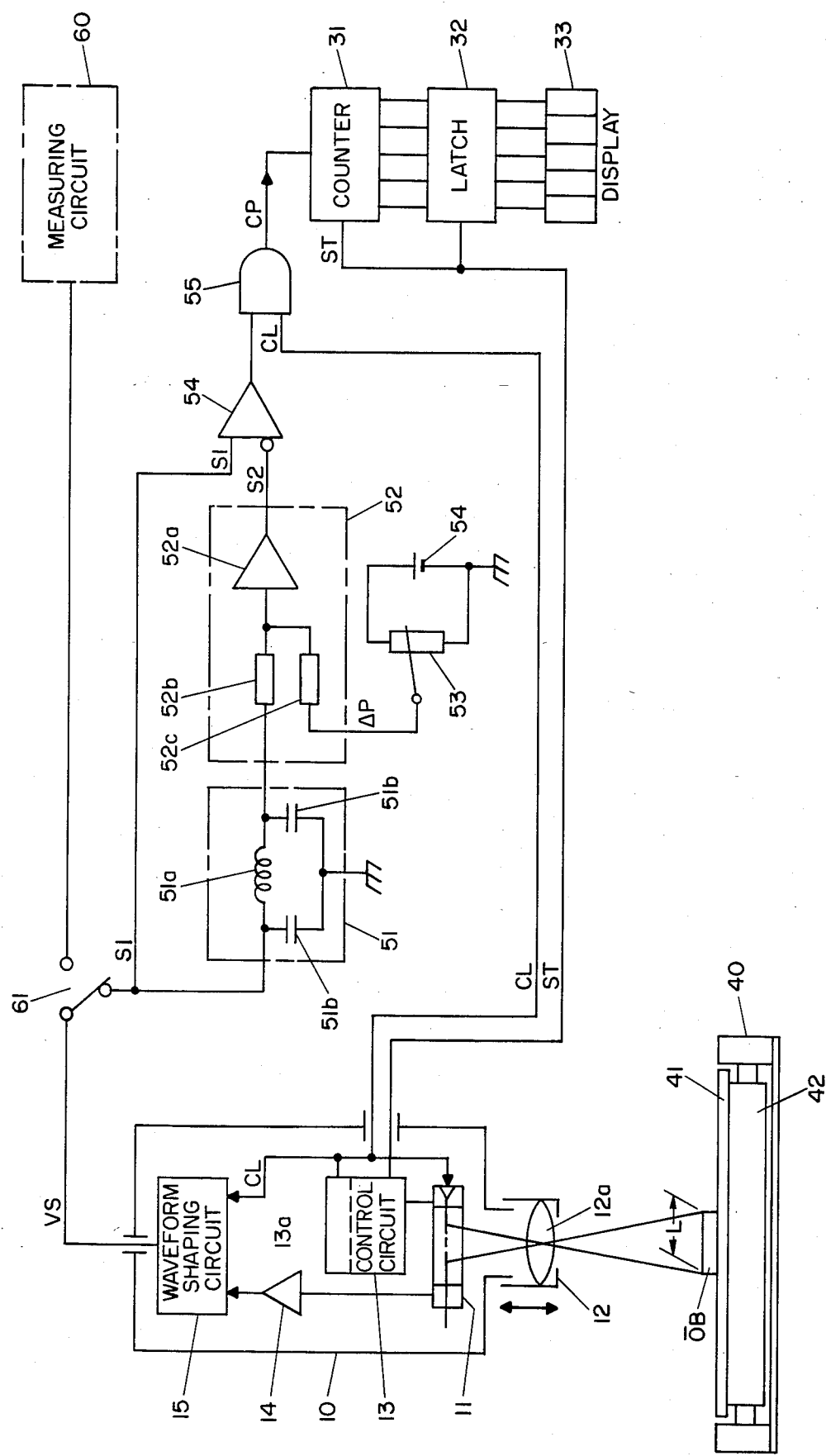
FIG. 1 shows an embodiment of the invention partially in block and partially circuit schematic form.

Referring to the drawings, embodiments according to the present invention will now be described in detail. For convenience sake, these embodiments will be described for the case where an image pickup device is used for the purpose of measurement; however, the present invention is not limited to that case.

In FIG. 1, an image pickup device 10 shown in the upper left portion may use a video camera. However, it is preferable to use for pickup a device in which a linear or a plane image sensor in the form of a charge coupled device (CCD) or a photodiode array is used as an image detector 11. The linear image sensor 11 receives light from an object OB to be picked-up disposed in the lower portion of the drawing, through a lens 12a of an optical system 12 of which the focal position is adjustable vertically in the drawing. This light is reflected illumination of light emitted from, for example, a fluorescent lamp (not shown). The object to be picked-up OB is mounted on a belt 41 of a conveyer device 40 and therefore this belt 41 is used as the background. The image pickup device 10 is designed for measuring the size of the object OB by remote control, the size being indicated by "L" in the drawing. Prior to this measurement, a video signal VS from the image pick-up device 10 is guided to a circuit for detecting a focused state through one of the positions of a two-position switch 61, as illustrated in the drawing, and the optical system 12 is adjusted to focus in the manner to be described below. After the focusing adjustment of the optical system 12, the video signal VS is supplied to a measuring circuit 60 outlined by a one-dotted chain line through the other position of the switch 61, so as to measure the size of the object OB. Since the belt 41 is driven by a roller 42 perpendicularly to the paper plane, also the area of the object L can be determined if the size L is integrated. In either event, if the optical system 12 has been once set in the focused position prior to the measurement, the focused state of the optical system 12 is maintained as it is, even if another object OB is conveyed by the belt 41, unless the kind of object changes. Therefore, an automatically focusing function of the optical system 12 is not employed in this example.

In the image pickup device 10, the image detector 11 receives light from the object OB through the optical system. A control circuit 13 generates a periodic synchronizing trigger pulse ST and a periodic read-out clocking pulse C which are supplied to the linear sensor to scan successive elements of the linear sensor and provide a train of video pulses VS which are supplied to a waveform shaping circuit 15 through amplifier 14 in known fashion of the prior art. In the clock cycle, there is a predetermined quiescent period TS which provides time for charge accumulation in the image sensor when required and for synchronization of the synchronizing pulse.

The circuit for detecting the focused state comprises a time shift circuit 51 and a level shift circuit 52 which are shown in the center portion of FIG. 1. The time shift circuit 51 may be a simple delay circuit constituted by a reactance element 51a and two capacitors 51b as illustrated in the drawing, and the delay or shift time $\Delta t$ of the time shift circuit 51 is selected, for example, to be a value several times as large as the period of a clock pulse CL. The level shift circuit 52 may be a so-called adder circuit having an operational amplifier 52a, to which the video signal VS shifted in time by the time shift circuit 51 and a voltage of a predetermined magnitude for providing a level shift $\Delta P$ are applied through attached resistors 52b and 52c, respectively, and from which a signal representing the resultant or sum of both the applied signals is produced. For example, the magnitude of level shift $\Delta P$ may have a small value, that slightly exceeds the operation threshold value, preset in a following comparator 54, and it is generated, for example, by a constant-voltage or constant-current regulated power supply 54 and a variable resistor 53 as shown in the drawing. Alternatively, a combination of fixed resistors may be used as the variable resistor 53 because if the value of P has been once set it is not necessary to adjust the resistor 53.

Figure 2:
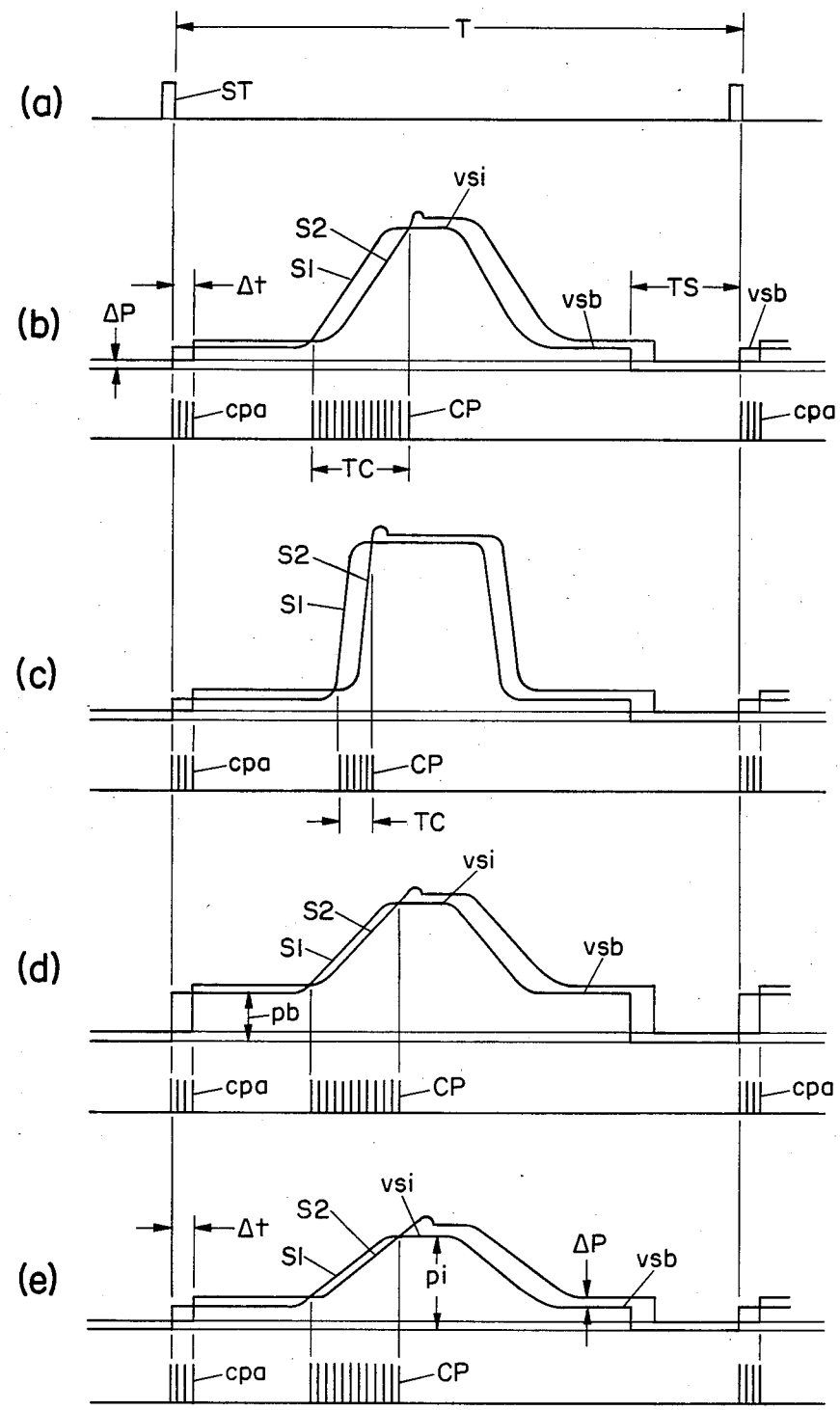
FIGS. 2A–2E, 3A–3B, 4 and 5B are waveforms useful in explaining the invention.

Next, referring to FIG. 2, the performance of both the circuits 51 and 52 will be described. The video signal VS is generated in synchronism with a synchronizing trigger pulse ST having a period T as shown in FIG. 2-A and, as seen from FIG. 1, the first comparison signal S1 supplied to comparator 54 is the video signal VS. The second comparison signal S2 is obtained by delaying the video signal VS by a predetermined time $\Delta t$ through the time shift circuit 51 and by level-shifting upward at the same time by by a predetermined value $\Delta P$ through the level shift circuit 52. S1 and S2 are shown in FIG. 2-B. The difference output signal from the comparator 54 is ANDed with clock pulses CL by an AND gate 55. The AND gate 55, therefore, produces count pulses CP, the number of which is proportional to the time width TC of that portion of the period in which the instantaneous value of the first comparison signal S1 exceeds that of the second comparison signal S2, as shown in FIG. 2-B. The count pulses CP are counted by a counter 31 in known fashion and the count number is displayed in a display device 33 through a latch 32. The position of the optical system 12 of the image pickup device 10 is adjusted to minimize the count value and this position represents the focused state.

In the case depicted, there is a quiescent period TS in the video signal that shows up in the first comparison signal S1, so that additional count pulses CPa are generated for the shift time $\Delta t$ after the quiescent period TS is ended, as shown in the drawing, and the number of these additional count pulses CPa is added to the above-mentioned count value. The count to be added, however, is a fixed value because it corresponds to the predetermined shift time $\Delta t$, and therefore the focusing adjustment described above is not affected by this added count. If necessary, however, the fixed value may be subtracted from the total count before display.

FIG. 2-B illustrates the case where the position of the optical system 12 to be adjusted is substantially removed from the focused point and the boundary gradient between an image portion VSi and a background portion VSb of the video signal VS is gently-sloping, for purpose of explanation, while FIG. 2-C shows the case where the optical system 12 is focused.

In this case, the time width TC of the count pulse CP is of course smaller than that of the case B, while equal to or slightly larger than the shift time $\Delta t$ provided by the time shift circuit 51. Therefore, the pulse count value corresponding to two times as large as that corresponding to the shift time $\Delta t$ may be subtracted in advance from the evaluation of focusing which is displayed by the display 33, taking into consideration the count of the previously discussed additional count pulses CPa. Further, as apparent from FIG. 2-C, a difference in analog value between the first and second comparison signals received by the comparator 54 becomes large at the focused point or in the vicinity of the focused point, in comparison with the positions separated from the focused position. It is because of this that the sensitivity for detecting focusing by the present invention becomes high in the vicinity of the focused point.

FIG. 2-D shows signal waveforms in the case where the level Pb of the background portion VSb of the video signal VS becomes high and the optical system is out of focus. The difference in magnitude between the first and second comparison signals S1 and S2 is decreased as illustrated in the drawing. However, it is not particularly difficult to compare the waveforms because the threshold value preset in the comparator 54 is sufficiently low. FIG. 2-E illustrates the case where the video signal level of the background portion VSb is not so high. However, intensity of illumination received by an object to be picked-up is low and the level Pi of the image portion VSi is therefore low.

As seen also from the explanation given above, the sensitivity in detecting focusing in the method according to the present invention becomes high in the vicinity of focus and becomes low as the position is separated from focus and as a difference in level between the image and background portions VSi and VSb of the video signal VS becomes small. Accordingly, in the latter situation it is preferable to make the threshold value of the comparator 54 low and the sensitivity of detection high by making the level shift small and the time shift large.

Figure 3:
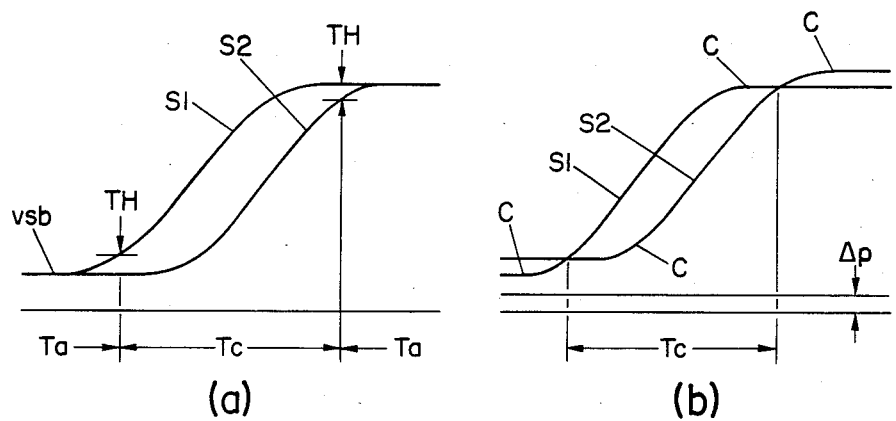

FIG. 3 shows the comparison between the cases of level shift ΔP and no level shift. Particularly, FIG. 3-A shows the case where the quantity of level shift ΔP is equal to zero and therefore the respective levels of the background portions VSb of the first and second comparison signals S1 and S2 are coincident with each other. In this case, if the threshold value TH of the comparator 54 is equal to zero, the output of the comparator 54 becomes unstable at the background portion VSb, but if the comparator 54 has an appropriate threshold value TH, the output signal of the comparator 54 can be obtained for the time width TC similarly to the foregoing case. Therefore, it is to be understood that the effect of a quantity of level shift ΔP can be replaced by choice of the threshold value TH of the comparator. FIG. 3-B shows the case where a prescribed level shift AP exists similarly to the cases of FIGS. 1 and 2. Each of the first and second comparison signals S1 and S2 has a gently-sloping corner portion between the plane portion and the leading portion (or the trailing portion). If an appropriate quantity of level shift AP is provided, the comparison signals S1 and S2 can cross one another so as to make the cross points not come to the respective corner portions, thereby making the operation of the comparator 54 sure. In FIG. 3-A, the symbol Ta designates time in which no output signal from the comparator 54 exists and in FIG. 3-B, it is assumed that the threshold value TH is zero for the sake of simplicity.

Figure 4:
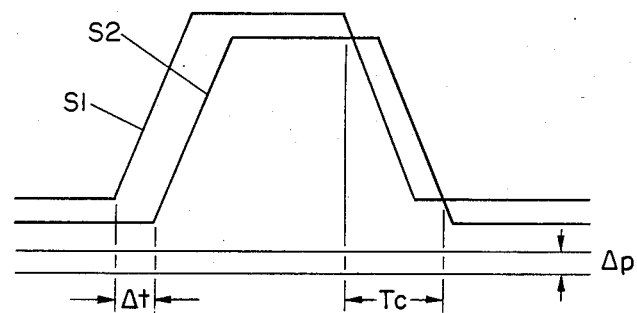

FIG. 4 helps explain the principle of another embodiment of the present invention. In this embodiment, the first comparison signal S1 is level-shifted upwardly by the quantity of level shift ΔP while the second comparison signal S2 is time-shifted by the shift time At. In this case, the same function can be achieved as in the case of FIGS. 1 and 2, while the two cases are different in that the output signal of the comparator 54 representing the time width TC is now generated at the trailing portion of each of the comparison signals S1 and S2 and that the inputs of the signals S1 and S2 into the comparator 54 are reversed.

Figure 5:
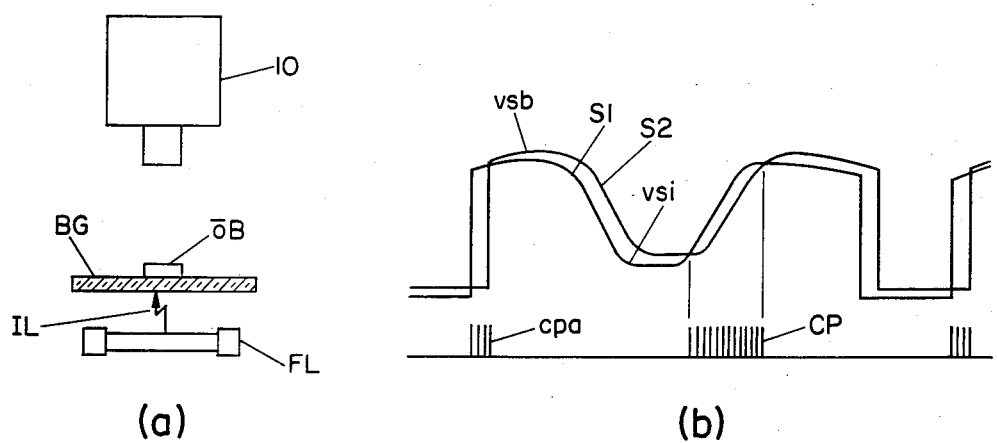
Figure 6:
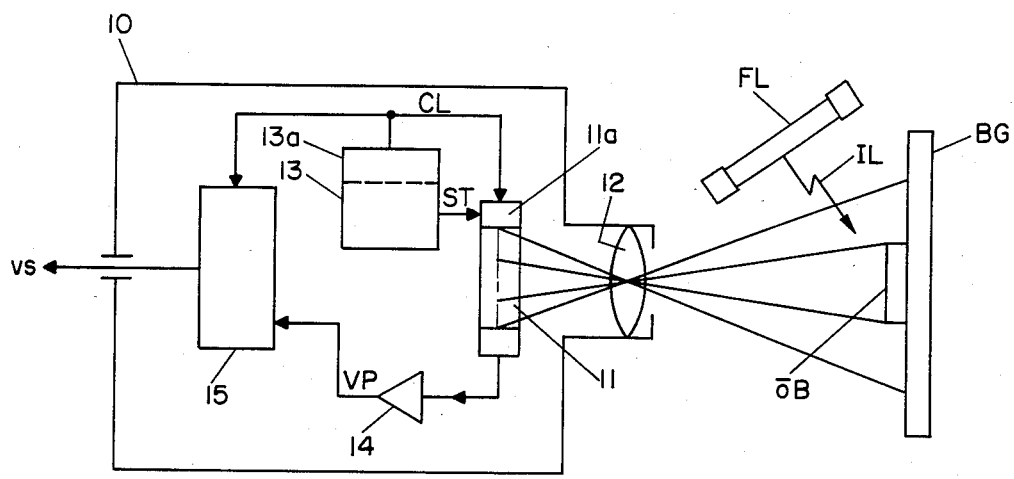
Figure 7:
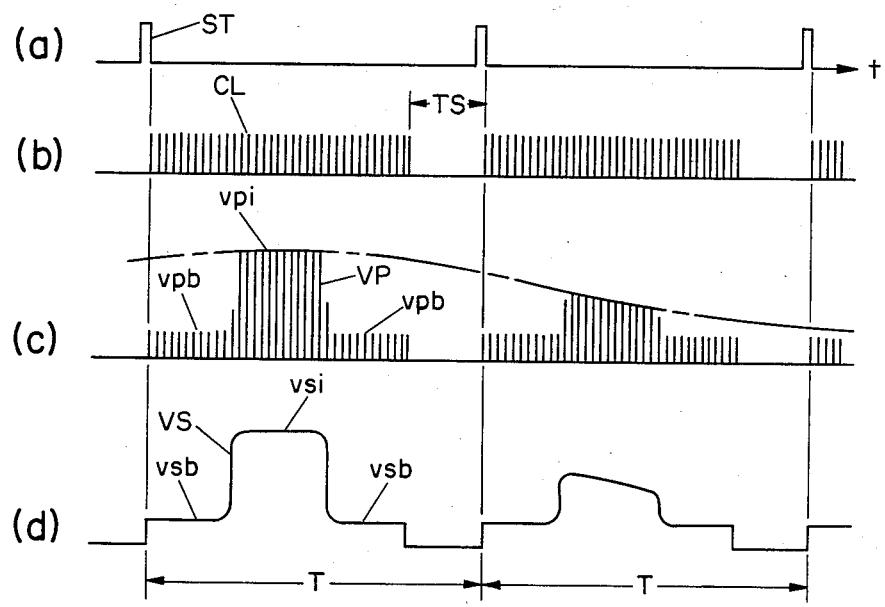
Figure 8:
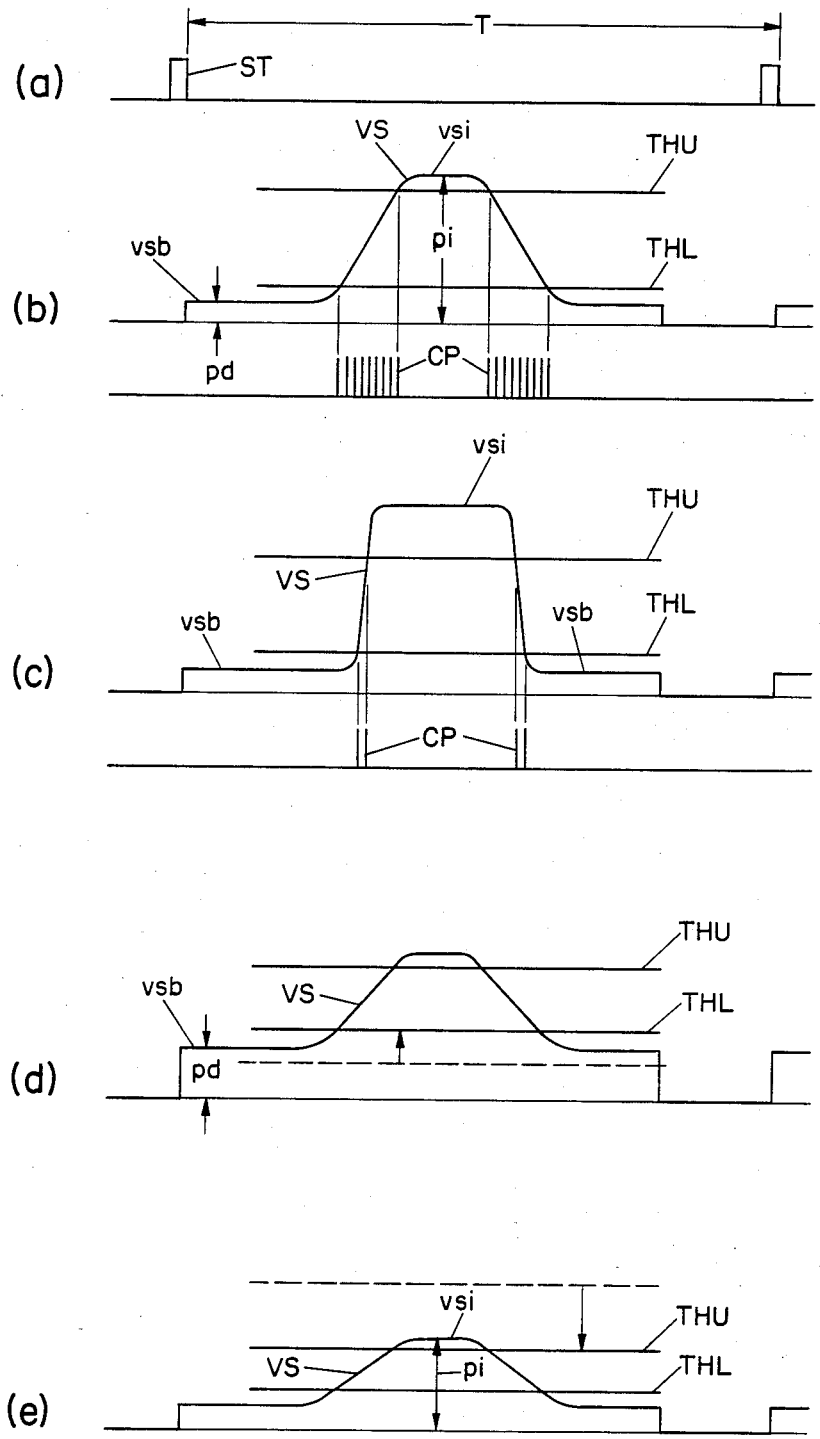
Figure 9:
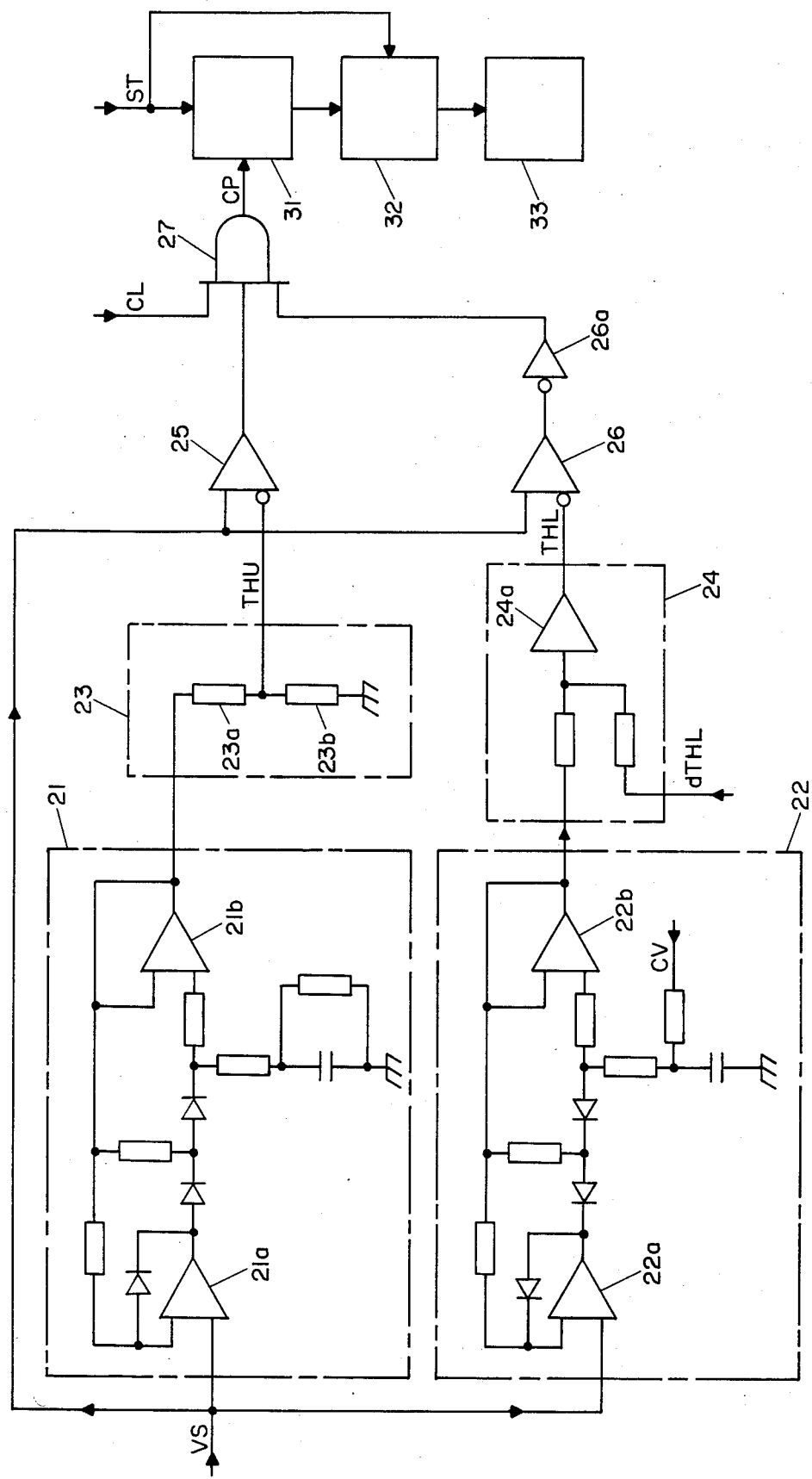

FIG. 5 shows still another embodiment of the method of the present invention. In this embodiment, an object OB to be picked-up is put on a background BG such as transparent glass or the like and illumination light IL from a light source FL disposed behind the background BG is received by an image pickup device 10 disposed above the OB, as shown in FIG. 5-A. In this case, image and background portions VSi and VSb of a video signal VS are reversed at their crest and trough portions in comparison with the foregoing embodiment, as shown in FIG. 5-B; however, it is recognized that the method of the present invention can be performed.

The present invention can be performed in several modified modes in addition to the embodiments described above. In the embodiments as described above, the number of the count pulses CP used as a standard to judge whether a focused state exists or not is merely displayed. However, it is possible to store the count value corresponding to that of a focused state and, when the count value of the count pulses becomes coincident with the stored or set count value, focus is reached. Further, it is possible to perform automatic focusing by using the minimum count value and feedback arrangements to minimize the count value or to reach a preset count value. It is not particularly necessary that an object to be picked-up and a background exist separately from each other in embodying the present invention, and it is possible to find a focused point by utilizing a difference in brightness and in hue in the object to be picked-up by arranging for these differences to be converted into a difference in the video signal level.

It should be apparent from the foregoing description that a system in accordance with the invention essentially avoids the problems of the prior art. The system is relatively immune to changes in the level of the illumination of the object. The sensitivity can be high especially in the region around the focus position. The circuitry is simple and uses available elements.

As a consequence, the invention lends itself to wide use in photography and pattern recognition systems.

What is claimed:

1. A method for adjusting the focused state of an adjustable optical system using an analog video signal which represents an image of an object to be focused on an image detection plane of an image pickup device through said adjustable optical system, said method comprising the steps of deriving from the analog signal a pair of comparison signals which differ from one another by at least one of a predetermined time shift and a predetermined average level shift, comparing said two signals, determining the time during which the instantaneous value of one of the two exceeds the other, and adjusting the optical system for minimizing the said time.

2. The method of claim 1 in which the first comparison signal is the analog signal and the second comparison signal is the analog signal after time shifting and level shifting.

3. The method of claim 2 in which the second comparison signal is time delayed and of increased average level.

4. The method of claim 1 in which the first comparison signal has its average level shifted and the second comparison signal is time shifted.

5. The method of claim 4 in which the first comparison signal has its average level increased and the second comparison signal has its time delayed.

6. The method of claim 1 in which the amount of level shifting is greater than the detection threshold value used in comparing the two signals.

7. The method of claim 1 in which there is no shift in average level and a low threshold level is used in the comparison.

8. Apparatus for adjusting the focus of an adjustable optical system comprising means for deriving an analog video signal of an object whose image is focused on an image detection plane through the adjustable optical system, means supplied with the analog signal for deriving first and second comparison signals which are time shifted and average-level shifted with respect to one another, means for determining the length of time during which the instantaneous values of the two comparison signals differ by more than a predetermined threshold value, and means for adjusting the optical system for minimizing said length of time.

9. Apparatus for adjusting the focus of an adjustable optical system comprising an image pick-up device on whose image detection plane is to be projected the image of an object by way of the adjustable optical system means for deriving an analog optical system from the image pick-up device, means for time shifting and level shifting the analog signal for deriving a shifted signal, and means supplied with the shifted signal and the analog signal for comparing the two and detecting the length of time during which the two signals differ by more than a fixed threshold level, for use in determining the position of the adjustable optical system for minimizing said length of time.

* * * * *